US012687182B2

(12) United States Patent
Ohira et al.

(10) Patent No.: US 12,687,182 B2
(45) Date of Patent: Jul. 21, 2026

(54) HYDRAULIC DRIVE APPARATUS

(71) Applicant: KAWASAKI JUKOGYO KABUSHIKI KAISHA, Kobe (JP)

(72) Inventors: Masahiro Ohira, Kobe (JP); Yoshiyuki Tode, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/846,559

(22) PCT Filed: Mar. 10, 2023

(86) PCT No.: PCT/JP2023/009374
§ 371 (c)(1),
(2) Date: Sep. 12, 2024

(87) PCT Pub. No.: WO2023/176732
PCT Pub. Date: Sep. 21, 2023

(65) Prior Publication Data

US 2026/0022713 A1 Jan. 22, 2026

(30) Foreign Application Priority Data

Mar. 15, 2022 (JP) ................................ 2022-040796

(51) Int. Cl.
*F15B 11/16* (2006.01)
*E02F 9/22* (2006.01)

(52) U.S. Cl.
CPC .......... *F15B 11/162* (2013.01); *E02F 9/2203* (2013.01); *E02F 9/2228* (2013.01);
(Continued)

(58) Field of Classification Search
CPC .......... F15B 11/162; F15B 2211/20538; F15B 2211/40; F15B 2211/40515;
(Continued)

(56) References Cited

U.S. PATENT DOCUMENTS 4,449,365 A * 5/1984 Hancock .................. B66F 9/22
60/423
5,782,260 A * 7/1998 Jacobs .................. F15B 13/022
137/118.02
(Continued)

FOREIGN PATENT DOCUMENTS

JP 2014167334 A 9/2014
JP 2020026828 A 2/2020

*Primary Examiner* — Dustin T Nguyen
(74) *Attorney, Agent, or Firm* — Alleman Hall LLP

(57) ABSTRACT

A hydraulic drive includes a hydraulic pump that discharges a working fluid; a travel system hydraulic circuit that is connected to a first passage branching from a pump passage connected to the hydraulic pump and controls a flow of the working fluid to a travel motor; a loading system hydraulic circuit that is connected to a second passage branching from the pump passage and controls a flow of the working fluid to a loading actuator; a flow rate control valve that is interposed in the second passage and changes an opening degree of the second passage according to a signal; a travel-end pressure sensor that detects a pressure being supplied to the travel motor; and a control device that controls, by outputting the signal to the flow rate control valve, the opening degree of the second passage according to the pressure detected by the travel-end pressure sensor.

8 Claims, 5 Drawing Sheets

(52) U.S. Cl.
CPC ............... *F15B 2211/20538* (2013.01); *F15B 2211/3111* (2013.01); *F15B 2211/40* (2013.01); *F15B 2211/40507* (2013.01); *F15B 2211/40515* (2013.01); *F15B 2211/41509* (2013.01); *F15B 2211/426* (2013.01); *F15B 2211/6052* (2013.01); *F15B 2211/6313* (2013.01); *F15B 2211/6346* (2013.01); *F15B 2211/7053* (2013.01); *F15B 2211/7058* (2013.01); *F15B 2211/7135* (2013.01); *F15B 2211/7142* (2013.01); *F15B 2211/781* (2013.01)

(58) Field of Classification Search
CPC ...... F15B 2211/41509; F15B 2211/426; F15B 2211/6313; F15B 2211/6346; F15B 2211/7135; F15B 2211/7142; F15B 2211/781
See application file for complete search history.

(56) References Cited

U.S. PATENT DOCUMENTS

| | | | | | |
|---|---|---|---|---|---|
| 5,784,883 | A * | 7/1998 | Ohkura | E02F 9/2253 60/449 |
| 6,422,121 | B1 * | 7/2002 | Wysong | B65G 53/4633 91/356 |
| 9,091,281 | B2 * | 7/2015 | Quinnell | E02F 9/2282 |
| 10,871,176 | B2 * | 12/2020 | Matsuzaki | E02F 9/2285 |
| 11,131,080 | B2 * | 9/2021 | Aoki | E02F 9/2228 |
| 12,497,760 | B2 * | 12/2025 | Ohira | E02F 9/2267 |
| 2005/0138924 | A1 * | 6/2005 | Kodama | E02F 9/2228 60/456 |
| 2017/0274930 | A1 * | 9/2017 | Zhang | F15B 13/025 |
| 2021/0140144 | A1 | 5/2021 | Aoki et al. | |

* cited by examiner

HYDRAULIC DRIVE APPARATUS

TECHNICAL FIELD

The present invention relates to a hydraulic drive apparatus that supplies a working fluid to a travel motor and a loading actuator.

BACKGROUND ART

A one-pump system in which a single pump serves as hydraulic sources for a travel motor and a loading actuator of construction equipment has been put into practice. For example, a hydraulic circuit such as that disclosed in Patent Literature (PTL) 1 is known as a hydraulic drive apparatus for the one-pump system. In the hydraulic circuit disclosed in PTL 1, a pump is connected to a travel motor and a loading actuator via a first pump line and a second pump line. A priority valve is provided on the second pump line. A supply pressure for the travel motor acts on the priority valve. Therefore, with the priority valve, when the supply pressure for the travel motor increases, the opening degree of the second pump line is restricted. As a result, pressure oil preferentially flows to the travel motor.

CITATION LIST

Patent Literature

PTL 1: Japanese Laid-Open Patent Application Publication No. 2020-026828

SUMMARY OF INVENTION

Technical Problem

In the hydraulic circuit disclosed in PTL 1, the priority valve restricts the opening degree of the second pump line according to the supply pressure that acts thereon. Therefore, in the priority valve, the relationship between the supply pressure and the opening degree of the second pump line is determined on a one-to-one basis. Thus, the degree of freedom for the priority valve is low regarding the control of the opening degree of the second pump line.

In view of this, an object of the present invention is to provide a hydraulic drive apparatus capable of improving the degree of freedom of control regarding the opening degree of a passage leading to a loading actuator.

Solution to Problem

A hydraulic drive apparatus according to the present invention supplies a working fluid to each of a travel motor and a loading actuator and includes: a hydraulic pump that discharges the working fluid; a travel system hydraulic circuit that is connected to a first passage branching from a pump passage connected to the hydraulic pump and controls a flow of the working fluid to the travel motor; a loading system hydraulic circuit that is connected to a second passage branching from the pump passage and controls a flow of the working fluid to the loading actuator; a flow rate control valve that is interposed in the second passage and changes an opening degree of the second passage according to an opening degree signal; a travel-end pressure sensor that detects a travel-end supply pressure that is a pressure being supplied to the travel motor; and a control device that controls, by outputting the opening degree signal to the flow rate control valve, the opening degree of the second passage according to the travel-end supply pressure detected by the travel-end pressure sensor.

According to the present invention, the control device controls the opening degree of the second passage by actuating the flow rate control valve according to the travel-end supply pressure. Therefore, by changing the control logic of the control device, it is possible to easily adjust the opening degree of the second passage that is opened in relation to the travel-end supply pressure. Thus, it is possible to improve the degree of freedom of control regarding the opening degree of the second passage.

Advantageous Effects of Invention

According to the present invention, it is possible to improve the degree of freedom of control regarding the opening degree of a passage leading to a loading actuator.

The above object, other objects, features, and advantages of the present invention will be made clear by the following detailed explanation of preferred embodiments with reference to the attached drawings.

DESCRIPTION OF EMBODIMENTS

Hereinafter, hydraulic drive apparatuses 1, 1A according to Embodiments 1, 2 of the present invention will be described with reference to the aforementioned drawings. Note that the concept of directions mentioned in the following description is used for the sake of explanation; the orientations, etc., of elements according to the invention are not limited to these directions. Each of the hydraulic drive apparatuses 1, 1A described below is merely one embodiment of the present invention. Thus, the present invention is not limited to the embodiments and may be subject to addition, deletion, and alteration within the scope of the essence of the invention.

Embodiment 1

Figure 1:
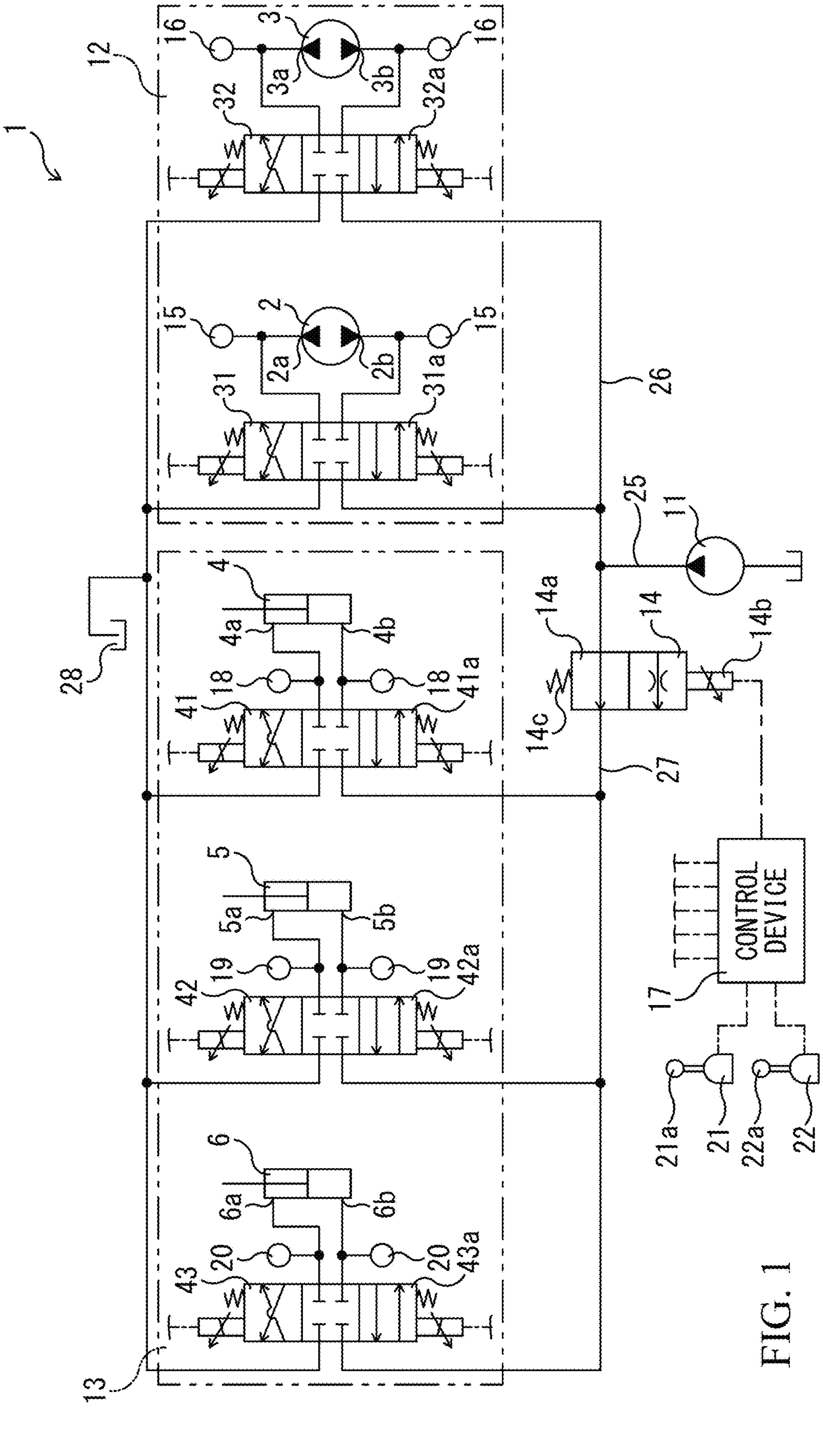
FIG. 1 is a circuit diagram illustrating the configuration of a hydraulic drive apparatus according to Embodiment 1 of the present invention.
Figure 2:
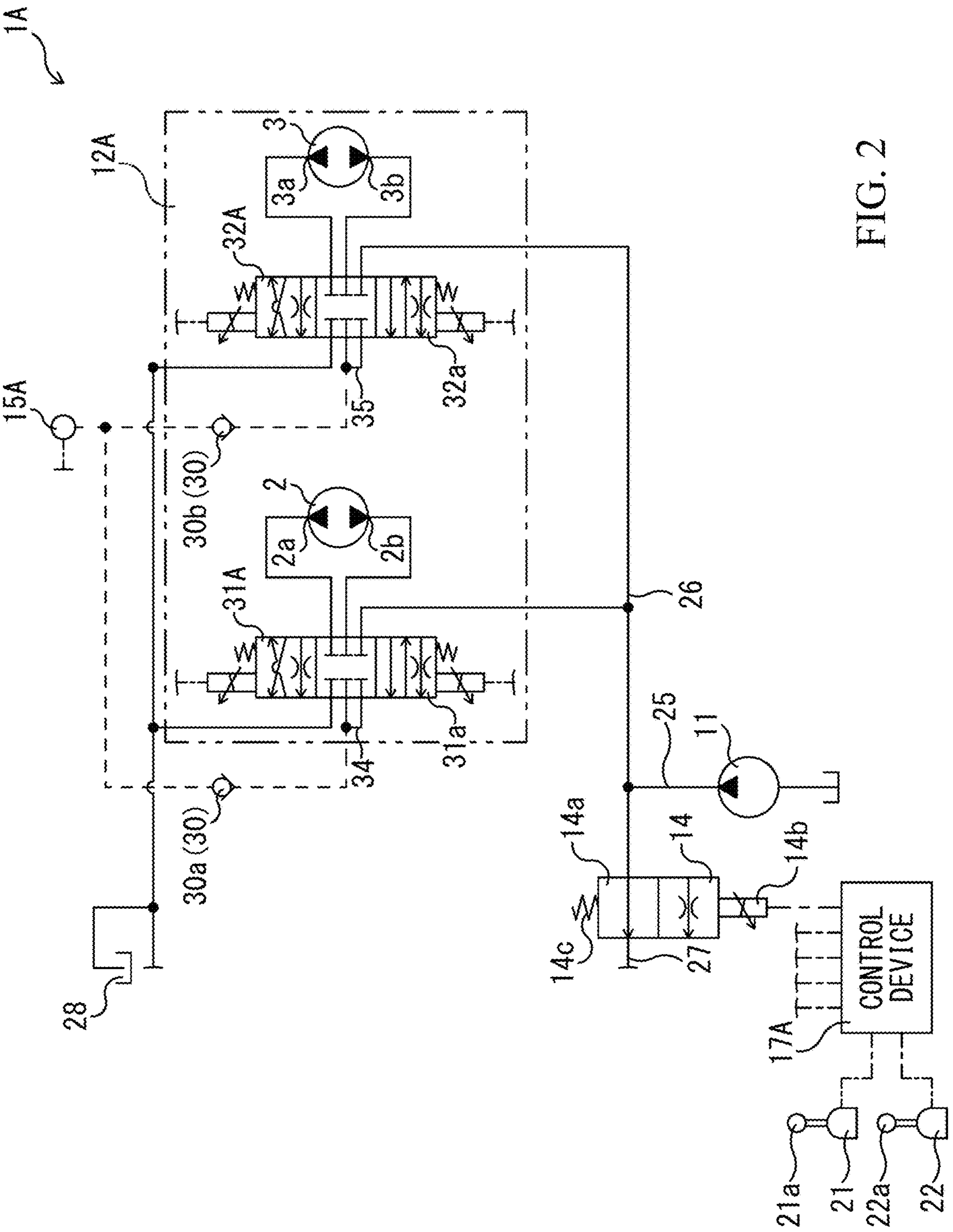
FIG. 2 is a circuit diagram illustrating a travel system hydraulic circuit of a hydraulic drive apparatus according to Embodiment 2 of the present invention.

The hydraulic drive apparatus 1 illustrated in FIG. 1 is included, for example, in a work vehicle (not illustrated in the drawings) including travel motors 2, 3 and loading actuators 4 to 6. Examples of the work vehicle include construction vehicles such as hydraulic excavators and hydraulic cranes and industrial vehicles such as forklifts. In the present embodiment, the hydraulic drive apparatus 1 is included in a hydraulic excavator, which is one example of the work vehicle. The hydraulic excavator includes a vehicle body and work equipment in addition to the hydraulic drive apparatus 1.

The vehicle body, which is a tracked vehicle, for example, includes a pair of left and right crawlers (not illustrated in the drawings) and a pair of left and right travel motors 2, 3. The vehicle body travels by actuating the pair of left and right crawlers. Note that the vehicle body may be a wheeled device; it is sufficient that the vehicle body be a device capable of traveling. The travel motors 2, 3, which are hydraulic motors, drive the left and right crawlers, respectively. More specifically, the travel motor 2 includes two supply/drainage ports 2*a*, 2*b*, and the travel motor 3 includes two supply/drainage ports 3*a*, 3*b*. The travel motors 2, 3 rotate in a normal direction when the working fluid is supplied to one of the supply/drainage ports, namely, the supply/drainage ports 2*a*, 3*a*, and rotate in the reverse direction when the working fluid is supplied to the other of the supply/drainage ports, namely, the supply/drainage ports 2*b*, 3*b*.

The work equipment includes a boom, an arm, a bucket (all of which are not illustrated in the drawings), and a plurality of loading actuators 4 to 6. The work equipment is rotatably provided on the vehicle body. In the present embodiment, the loading actuators 4 to 6 are hydraulic cylinders 4 to 6. The hydraulic cylinders 4 to 6 are provided on the boom, the arm, and the bucket, respectively. The work equipment moves the boom, the arm, and the bucket by extending and retracting the three hydraulic cylinders 4 to 6. Thus, the work equipment can perform various tasks.

<Hydraulic Drive Apparatus>

The hydraulic drive apparatus 1 includes a hydraulic pump 11, a travel system hydraulic circuit 12, a loading system hydraulic circuit 13, a flow rate control valve 14, travel-end pressure sensors 15, 16, and a control device 17. More specifically, the hydraulic drive apparatus 1 further includes loading-end pressure sensors 18 to 20, a travel system operation device 21, and a loading system operation device 22. The hydraulic drive apparatus 1, which is a so-called one-pump system, supplies the working fluid from one hydraulic pump 11 to the travel motors 2, 3 and the three third hydraulic cylinders 4 to 6. By supplying the working fluid to the first travel motor 2 and the second travel motor 3, the hydraulic drive apparatus 1 actuates the crawlers corresponding, respectively, to the travel motors 2, 3. Thus, the hydraulic drive apparatus 1 can cause the hydraulic excavator to travel. By supplying the working fluid to the hydraulic cylinders 4 to 6, the hydraulic drive apparatus 1 actuates the corresponding boom, arm, and bucket. Thus, the hydraulic drive apparatus 1 can cause the hydraulic excavator to perform various tasks.

<Hydraulic Pump>

The hydraulic pump 11 discharges the working fluid. More specifically, the hydraulic pump 11 is connected to a drive source not illustrated in the drawings (for example, an engine and an electric motor). The hydraulic pump 11 is connected to a pump passage 25. The hydraulic pump 11 is rotatably driven by the drive source and thereby discharges the working fluid to the pump passage 25. The pump passage 25 is divided as a first passage 26 and a second passage 27.

<Travel System Hydraulic Circuit>

The travel system hydraulic circuit 12 includes a first traveling directional control valve 31 and a second traveling directional control valve 32. The travel system hydraulic circuit 12 is connected to the first passage 26, the first travel motor 2, and the second travel motor 3. The travel system hydraulic circuit 12 supplies the working fluid to each of the first travel motor 2 and the second travel motor 3. The travel system hydraulic circuit 12 controls the flow of the working fluid to each of the first travel motor 2 and the second travel motor 3. More specifically, the travel system hydraulic circuit 12 supplies, to the first travel motor 2 and the second travel motor 3, the working fluid that flows (in the present embodiment, at a flow rate in a flow direction) according to the input first travel command and the input second travel command.

The first traveling directional control valve 31 includes a first traveling spool 31*a*. The first traveling directional control valve 31 controls the flow of the working fluid to the first travel motor 2. More specifically, the first traveling directional control valve 31 is connected to the first passage 26, a tank 28, and the two supply/drainage ports 2*a*, 2*b* of the first travel motor 2. The first traveling spool 31*a* moves according to the input first travel command. As a result, destinations to which the supply/drainage ports 2*a*, 2*b* are connected are switched to the first passage 26 and the tank 28. The first traveling spool 31*a* changes the opening degree according to the position thereof. Therefore, the working fluid is supplied from the first traveling directional control valve 31 to the first travel motor 2 at a flow rate corresponding to the first travel command, in a direction corresponding to the first travel command. Thus, the first traveling directional control valve 31 causes the first travel motor 2 to rotate in normal and reverse directions according to the first travel command, and causes the first travel motor 2 to rotate at a speed corresponding to the first travel command. In the present embodiment, the first traveling directional control valve 31 is an electrically controlled directional control valve.

The second traveling directional control valve 32 includes a second traveling spool 32*a*. The second traveling directional control valve 32 controls the flow of the working fluid to the second travel motor 3. More specifically, the second traveling directional control valve 32 is connected to the first passage 26 so as to be parallel to the first traveling directional control valve 31. Furthermore, the second traveling directional control valve 32 is connected to the tank 28 and the two supply/drainage ports 3*a*, 3*b* of the second travel motor 3. The second traveling spool 32*a* moves according to the input second travel command. As a result, destinations to which the supply/drainage ports 3*a*, 3*b* are connected are switched to the first passage 26 and the tank 28. The second traveling spool 32*a* changes the opening degree according to the position thereof. Therefore, the working fluid is supplied from the second traveling directional control valve 32 to the second travel motor 3 at a flow rate corresponding to the second travel command, in a direction corresponding to the second travel command. Thus, the second traveling directional control valve 32 causes the second travel motor 3 to rotate in normal and reverse directions according to the second travel command, and causes the second travel motor 3 to rotate at a speed corresponding to the second travel command. In the present embodiment, the second traveling directional control valve 32 is an electrically controlled directional control valve.

<Loading System Hydraulic Circuit>

The loading system hydraulic circuit 13 includes a plurality of loading directional control valves 41 to 43. In the present embodiment, the loading system hydraulic circuit 13 includes three loading directional control valves 41 to 43. The three loading directional control valves 41 to 43 are a boom directional control valve 41, an arm directional control valve 42, and a bucket directional control valve 43. The loading system hydraulic circuit 13 is connected to the second passage 27 and the three hydraulic cylinders 4 to 6. The loading system hydraulic circuit 13 supplies the working fluid to each of the three hydraulic cylinders 4 to 6. The loading hydraulic circuit 13 controls the flow of the working fluid to each of the hydraulic cylinders 4 to 6. More specifically, the loading system hydraulic circuit 13 supplies, to the three hydraulic cylinders 4 to 6, the working fluid that flows (in the present embodiment, at a flow rate in a flow direction) according to the input loading command.

The three loading directional control valves 41 to 43 include loading spools 41*a* to 43*a*, respectively. The three loading directional control valves 41 to 43 control the flow of the working fluid to the corresponding hydraulic cylinders 4 to 6. Specifically, the boom directional control valve 41 controls the flow of the working fluid to the boom cylinder 4. The arm directional control valve 42 controls the flow of the working fluid to the arm cylinder 5. The bucket directional control valve 43 controls the flow of the working fluid to the bucket cylinder 6. The three loading directional control valves 41 to 43 are connected to the second passage 27 so as to be parallel to each other. Furthermore, the three loading directional control valves 41 to 43 are connected to the tank 28 and rod-end ports 4*a*, 5*a*, 6*a* and head-end ports 4*b*, 5*b*, 6*b* of the hydraulic cylinders 4 to 6. The loading spools 41*a* to 43*a* move according to a boom command, an arm command, and a bucket command. Thus, directions to which the rod-end ports 4*a* to 6*a* and the head-end ports 4*b* to 6*b* are connected switch to the second passage 27 and the tank 28. The loading spools 41*a* to 43*a* change the opening degrees according to the positions thereof. Therefore, the working fluid is supplied from each of the loading directional control valves 41 to 43 to a corresponding one of the hydraulic cylinders 4 to 6 at a flow rate corresponding to a corresponding one of the commands, in a direction corresponding to said command. This allows the loading directional control valves 41 to 43 to extend and retract the corresponding hydraulic cylinders 4 to 6 at speeds corresponding to the corresponding commands. Note that the loading directional control valves 41 to 43 are also electrically controlled directional control valves in the present embodiment.

<Flow Rate Control Valve>

The flow rate control valve 14 is an electrically controlled valve. The flow rate control valve 14, which is an electrically controlled spool valve, for example, includes a control spool 14*a*. The flow rate control valve 14 is interposed in the second passage 27. The flow rate control valve 14 changes the opening degree of the second passage 27 according to the input opening degree signal. More specifically, according to the input opening degree signal, the flow rate control valve 14 restricts the flow rate of the working fluid flowing to the second passage 27. As a result, the working fluid preferentially flows to the travel system hydraulic circuit 12. In the present embodiment, one flow rate control valve 14 is provided for one hydraulic pump 11 in the hydraulic drive apparatus 1. In the hydraulic drive apparatus 1, one flow rate control valve 14 allows the working fluid to preferentially flow to the travel system hydraulic circuit 12.

The control spool 14*a* moves according to the input opening degree signal. Thus, the control spool 14*a* restricts the opening degree of the second passage 27 according to the input opening degree signal. In the present embodiment, the flow rate control valve 14 includes a proportional solenoid valve 14*b* and a spring 14*c*. The proportional solenoid valve 14*b* outputs, to the control spool 14*a*, a pilot pressure corresponding to the opening degree signal. The spring 14*c* acts on the control spool 14*a* against the pilot pressure of the proportional solenoid valve 14*b*. Therefore, the control spool 14*a* moves to a position corresponding to the pilot pressure that is output from the proportional solenoid valve 14*b*. Thus, the control spool 14*a* restricts the opening degree of the second passage 27 to an opening degree corresponding to the opening degree signal.

<First Travel-End Pressure Sensor>

The first travel-end pressure sensor 15 detects a first travel-end supply pressure which is a pressure being supplied to the first travel motor 2. More specifically, the first travel-end pressure sensor 15 detects the hydraulic pressure of the working fluid being supplied from the first traveling directional control valve 31 to the first travel motor 2. In the present embodiment, the first travel-end pressure sensor 15 is provided on each of the supply/drainage ports 2*a*, 2*b* of the first travel motor 2. The first travel-end pressure sensor 15 outputs the hydraulic pressure detected at the supply/drainage ports 2*a*, 2*b* of the first travel motor 2.

<Second Travel-End Pressure Sensor>

The second travel-end pressure sensor 16, which is a sensor different from the first travel-end pressure sensor 15, detects a second travel-end supply pressure which is a pressure being supplied to the second travel motor 3. More specifically, the second travel-end pressure sensor 16 detects the hydraulic pressure of the working fluid being supplied from the second traveling directional control valve 32 to the second travel motor 3. In the present embodiment, the second travel-end pressure sensor 16 is provided on each of the supply/drainage ports 3*a*, 3*b* of the second travel motor 3. The second travel-end pressure sensor 16 outputs the hydraulic pressure detected at the supply/drainage ports 3*a*, 3*b* of the second travel motor 3.

<Loading-End Pressure Sensor>

The loading-end pressure sensors 18 to 20 detect loading-end supply pressures which are pressures being supplied to the hydraulic cylinders 4 to 6. More specifically, each of the loading-end pressure sensors 18 to 20 detects a supply pressure being supplied to a corresponding one of the boom cylinder 4, the arm cylinder 5, and the bucket cylinder 6. In the present embodiment, the loading-end pressure sensors 18 to 20 are connected to the rod-end ports 4*a* to 6*a* and the head-end ports 4*b* to 6*b* of the hydraulic cylinders 4 to 6. The loading-end pressure sensors 18 to 20 output the hydraulic pressures detected at the rod-end ports 4*a* to 6*a* and the head-end ports 4*b* to 6*b* of the hydraulic cylinders 4 to 6.

<Travel System Operation Device>

The travel system operation device 21 is a device for an operator to operate the travel motors 2, 3. The travel system operation device 21 includes a traveling operation lever 21*a* which is, for example, an operation tool. The traveling operation lever 21*a* can be tilted. In the present embodiment, the traveling operation lever 21*a* can be tilted in all directions, for example. The travel system operation device 21 outputs a travel operation command corresponding to the direction of tilt and the amount of tilt. Note that the operation tool included in the travel system operation device 21 may be an operation pedal, and the form thereof is not limited.

<Loading System Operation Device>

The loading system operation device 22 is a device for an operator to operate an attachment (that is a bucket in the present embodiment). More specifically, an operation tool in the loading system operation device 22 includes a loading operation lever 22*a*. The loading operation lever 22*a* can be tilted. In the present embodiment, the loading operation lever 22*a* can be tilted in the depth direction, for example. The loading system operation device 22 outputs a loading operation command corresponding to the direction of tilt and the amount of tilt. Note that the operation tool included in the loading system operation device 22 is not limited to the loading operation lever 22*a* and may be in other forms such as an operation panel.

<Control Device>

The control device 17 controls the operation of the travel system hydraulic circuit 12. More specifically, the control device 17 obtains the travel operation command that is output from the travel system operation device 21. Accordingly, the control device 17 controls the movement of the first traveling directional control valve 31 and the second traveling directional control valve 32 (specifically, the positions of the spools 31*a*, 32*a*) according to the travel operation command. In the present embodiment, the control device 17 outputs the first travel command and the second travel command according to the travel operation command. As a result, the first travel motor 2 and the second travel motor 3 rotate at rotational speeds corresponding to the travel operation command, in directions corresponding to the travel operation command, and thus the hydraulic excavator moves at a speed corresponding to the travel operation command, in a direction corresponding to the travel operation command.

Furthermore, the control device 17 controls the operation of the loading system hydraulic circuit 13. More specifically, the control device 17 obtains the loading operation command that is output from the loading system operation device 22. Accordingly, the control device 17 controls the movement of the loading directional control valves 41 to 43 (specifically, the positions of the spools 41*a* to 43*a*) according to the loading operation command. In the present embodiment, the control device 17 outputs the boom command, the arm command, and the bucket command according to the loading operation command. Accordingly, the hydraulic cylinders 4 to 6 are extended and retracted at speeds corresponding to the loading operation command. Thus, it is possible to move the bucket at a speed corresponding to the loading operation command, in a direction corresponding to the loading operation command, allowing the hydraulic excavator to perform a predetermined task.

Furthermore, the control device 17 outputs the opening degree signal to the flow rate control valve 14 and thereby controls the opening degree of the second passage 27 according to the travel-end supply pressures detected by the travel-end pressure sensors 15, 16 and the loading-end supply pressures detected by the loading-end pressure sensors 18 to 20. More specifically, the control device 17 obtains the travel-end supply pressure and the loading-end supply pressure. In the present embodiment, the control device 17 selectively obtains the first travel-end supply pressure and the second travel-end supply pressure from the hydraulic pressures detected by the travel-end pressure sensors 15, 16. The control device 17 estimates a port serving as a supply end among the supply/drainage ports 2*a*, 2*b*, 3*a*, 3*b* on the basis of the travel operation command, for example. The control device 17 obtains, as the first travel-end supply pressure and the second travel-end supply pressure, the hydraulic pressures at the ports serving as the supply end. The control device 17 selectively obtains the loading-end supply pressures of the hydraulic cylinders 4 to 6 in substantially the same manner from the hydraulic pressures detected by the loading-end pressure sensors 18 to 20. Furthermore, the control device 17 outputs the opening degree signal to the flow rate control valve 14 according to the first travel-end supply pressure, the second travel-end supply pressure, and the loading-end supply pressures of the hydraulic cylinders 4 to 6 that have been obtained. Thus, the control spool 14*a* moves to a position corresponding to the first travel-end supply pressure, the second travel-end supply pressure, and the loading-end supply pressures of the hydraulic cylinders 4 to 6. Therefore, the opening degree of the second passage 27 is controlled according to the first travel-end supply pressure, the second travel-end supply pressure, and the loading-end supply pressure.

For example, when the maximum value of the two travel-end supply pressures meets a predetermined condition, such as being greater than or equal to a predetermined travel-end threshold value, the control device 17 restricts the opening degree of the second passage 27. When the maximum value of the two travel-end supply pressures is less than the travel-end threshold value, the control device 17 opens the second passage 27. Note that the travel-end threshold value is set in the control device 17 in advance. Furthermore, the travel-end threshold value is set in such a manner as to be adjustable, for example.

Furthermore, the control device 17 moves the control spool 14*a* according to the first travel-end supply pressure, the second travel-end supply pressure, and the three loading-end supply pressures on the basis of the program, etc., set in advance. Thus, the second passage 27 is controlled to have an opening degree corresponding to the first travel-end supply pressure, the second travel-end supply pressure, and the three loading-end supply pressures. The control device 17 can change the opening degrees of the second passage 27 that is opened in relation to the first travel-end supply pressure, the second travel-end supply pressure, and the loading-end supply pressures of the hydraulic cylinders 4 to 6. For example, the control device 17 adjusts the command values of commands that are output according to the first travel-end supply pressure, the second travel-end supply pressure, and the loading-end supply pressures of the hydraulic cylinders 4 to 6. Thus, for example, the opening degree of the second passage 27 that is open according to the first travel-end supply pressure and the second travel-end supply pressure can be adjusted according to the loading-end supply pressure.

<Operation of Hydraulic Drive Apparatus>

In the hydraulic drive apparatus 1, when the traveling operation lever 21*a* of the travel system operation device 21 is operated solely, the travel system operation device 21 outputs the travel operation command. Accordingly, the control device 17 actuates the traveling directional control valves 31, 32 and controls the flow of the working fluid to the travel motors 2, 3 so that the working fluid flows (in the present embodiment, at a flow rate in a flow direction) according to the travel operation command. Thus, the control device 17 can cause the hydraulic excavator to perform a travel operation corresponding to the operation of the traveling operation lever 21*a*. Note that when the working fluid is supplied to the travel motors 2, 3 and the maximum value of the first travel-end supply pressure and the second travel-end supply pressure reaches at least the travel-end threshold value, the control device 17 restricts the opening degree of the second passage 27.

In the hydraulic drive apparatus 1, when the loading operation lever 22*a* of the loading system operation device 22 is operated solely, the loading system operation device 22 outputs the loading operation command. Accordingly, the control device 17 actuates the loading directional control valves 41 to 43 and controls the flow of the working fluid to the hydraulic cylinders 4 to 6 so that the working fluid flows (in the present embodiment, at a flow rate in a flow direction) according to the loading operation command. Thus, the control device 17 can cause the bucket to perform an operation corresponding to the operation of the loading operation lever 22*a*. Note that when the loading operation lever 22*a* is operated solely, the maximum value of the first travel-end supply pressure and the second travel-end supply pressure becomes less than the travel-end threshold value, and thus the control device 17 opens the second passage 27.

When the traveling operation lever 21*a* and the loading operation lever 22*a* are operated at the same time, the hydraulic drive apparatus 1 operates as follows. Specifically, the control device 17 actuates the flow rate control valve 14 on the basis of the travel-end supply pressure and the loading-end supply pressure obtained. For example, when the maximum value of the two travel-end supply pressures is greater than or equal to the travel-end threshold value, the control device 17 restricts the opening degree of the second passage 27 by moving the control spool 14*a* of the flow rate control valve 14. As a result, the deficiency in the supply of the working fluid to the travel motors 2, 3 is reduced. The second passage 27 is controlled to have an opening degree corresponding to the travel-end supply pressure and the loading-end supply pressure. Thus, the loading system hydraulic circuit 13 can also be supplied with an appropriate amount of the working fluid. On the other hand, when the maximum value of the two travel-end supply pressures is less than the travel-end threshold value, the control device 17 opens the second passage 27 by controlling the movement of the control spool 14*a* of the flow rate control valve 14. As a result, the deficiency in the supply of the working fluid to the hydraulic cylinders 4 to 6 is reduced.

In the hydraulic drive apparatus 1 according to Embodiment 1, the control device 17 controls the opening degree of the second passage 27 by actuating the flow rate control valve 14 according to the travel-end supply pressure. Therefore, by changing the control logic of the control device 17, it is possible to easily adjust the opening degree of the second passage 27 that is opened in relation to the travel-end supply pressure. For example, the control device 17 easily adjusts the travel-end threshold value and the loading-end threshold value and easily adjusts the opening degree of the passage to be opened in relation to the travel-end supply pressure. Thus, it is possible to improve the degree of freedom of control regarding the opening degree of the second passage 27.

In the hydraulic drive apparatus 1 according to Embodiment 1, the control device 17 controls the opening degree of the second passage 27 according to the travel-end supply pressure and the loading-end supply pressure. Therefore, the control device 17 can adjust, according to the loading-end supply pressure, the opening degree of the second passage 27 to be restricted in relation to the travel-end supply pressure. Thus, the flow rate of the working fluid flowing to the travel system hydraulic circuit 12 can be adjusted according to the situations of the loading actuators 4 to 6.

In the hydraulic drive apparatus 1 according to Embodiment 1, the control device 17 controls the opening degree of the second passage 27 according to the first travel-end supply pressure and the second travel-end supply pressure. Therefore, even when the travel system hydraulic circuit 12 supplies the working fluid to the two travel motors 2, 3, it is possible to improve the degree of freedom of control regarding the opening degree of the second passage 27.

In the hydraulic drive apparatus 1 according to Embodiment 1, the first travel-end pressure sensor 15 detects the hydraulic pressure of the working fluid being supplied from the first traveling directional control valve 31 to the first travel motor 2. The second travel-end pressure sensor 16 detects the hydraulic pressure of the working fluid being supplied from the second traveling directional control valve 32 to the second travel motor 3. Therefore, it is possible to easily obtain the supply pressure of the working fluid being supplied to each of the travel motors 2, 3.

In the hydraulic drive apparatus 1 according to Embodiment 1, the control device 17 controls the opening degree of the second passage 27 according to the first travel-end supply pressure, the second travel-end supply pressure, and the plurality of loading-end supply pressures. Therefore, the control device 17 controls the opening degree of the second passage 27 according to the first travel-end supply pressure, the second travel-end supply pressures, and the three loading-end supply pressures. Therefore, the control device 17 can adjust, according to the plurality of loading-end supply pressures, the opening degree of the second passage 27 to be restricted in relation to the first travel-end supply pressure and the second travel-end supply pressure. Thus, the flow rate of the working fluid flowing to the travel system hydraulic circuit 12 can be adjusted according to the situation of each of the loading actuators 4 to 6.

In the hydraulic drive apparatus 1 according to Embodiment 1, each of the plurality of loading-end pressure sensors 18 to 20 detects the supply pressure of the working fluid being supplied from a corresponding one of the loading directional control valves 41 to 43 to a corresponding one of the hydraulic cylinders 4 to 6. Therefore, it is possible to easily obtain the supply pressure of the working fluid being supplied to each of the hydraulic cylinders 4 to 6.

In the hydraulic drive apparatus 1 according to Embodiment 1, the control device 17 actuates the flow rate control valve 14 on the basis of the maximum value of the plurality of loading-end supply pressures and the maximum value of the first and second travel-end supply pressures. Therefore, the control device 17 can adjust the opening degree of the second passage 27 according to the highest supply pressure at the travel motors 2, 3 and the hydraulic cylinders 4 to 6. Therefore, the control device 17 can adjust, according to the maximum pressure among the three loading-end supply pressures, the opening degree of the second passage 27 to be restricted in relation to the travel-end supply pressure. Thus, the flow rate of the working fluid flowing to the travel system hydraulic circuit 12 can be adjusted according to the highest load among loads on the loading actuators 4 to 6.

Embodiment 2

A hydraulic drive apparatus 1A according to Embodiment 2 has a configuration similar to the configuration of the hydraulic drive apparatus 1 according to Embodiment 1. The configuration of the hydraulic drive apparatus 1A according to Embodiment 2 will be described focusing on differences from the hydraulic drive apparatus 1 according to Embodiment 1; elements that are the same as those of the hydraulic drive apparatus 1 according to Embodiment 1 share the same reference signs, and as such, description of the elements will be omitted.

The hydraulic drive apparatus 1A includes the hydraulic pump 11, a travel system hydraulic circuit 12A, the loading system hydraulic circuit 13, the flow rate control valve 14, the supply pressure selection circuit 30, a travel-end pressure sensor 15A, and a control device 17A. More specifically, the hydraulic drive apparatus 1A further includes the loading-end pressure sensors 18 to 20, the travel system operation device 21, and the loading system operation device 22. The travel system hydraulic circuit 12A includes a first traveling directional control valve 31A and a second traveling directional control valve 32A.

The first traveling directional control valve 31A is connected to a first intermediate passage 34. The first intermediate passage 34 is connected to the first passage 26 via the first traveling directional control valve 31A. The first traveling directional control valve 31A controls the opening degree between the first intermediate passage 34 and the first passage 26 according to the position of the first traveling spool 31*a*. Therefore, the first travel-end supply pressure is output to the first intermediate passage 34. The first intermediate passage 34 is connected to one of the two supply/drainage ports 2*a*, 2*b* of the first travel motor 2 in addition to the first passage 26. More specifically, the first intermediate passage 34 is connected to one of the supply/drainage ports 2*a*, 2*b* according to the position of the first traveling spool 31*a*. Note that the other of the supply/drainage ports 2*a*, 2*b* is connected to the tank 28.

The second traveling directional control valve 32A is connected to a second intermediate passage 35. The second intermediate passage 35 is connected to the first passage 26 via the second traveling directional control valve 32A. The second traveling directional control valve 32A controls the opening degree between the second intermediate passage 35 and the first passage 26 according to the position of the second traveling spool 32*a*. Therefore, the second travel-end supply pressure is output to the second intermediate passage 35. The second intermediate passage 35 is connected to one of the two supply/drainage ports 3*a*, 3*b* of the second travel motor 3 in addition to the first passage 26. More specifically, the second intermediate passage 35 is connected to one of the supply/drainage ports 3*a*, 3*b* according to the position of the second traveling spool 32*a*. Note that the other of the supply/drainage ports 3*a*, 3*b* is connected to the tank 28.

The supply pressure selection circuit 30 includes two check valves 30*a*, 30*b*. The supply pressure selection circuit 30 is connected to the first intermediate passage 34 and the second intermediate passage 35. The supply pressure selection circuit 30 obtains the first travel-end supply pressure and the second travel-end supply pressure from the intermediate passages 34, 35. The supply pressure selection circuit 30 selects and outputs the higher one of the first travel-end supply pressure and the second travel-end supply pressure.

One of the check valves, namely, the check valve 30*a*, is connected to the first intermediate passage 34, and the other of the check valves, namely, the check valve 30*b*, is connected to the second intermediate passage 35. The two check valves 30*a*, 30*b* are connected to each other on the downstream side. Each of the two check valves 30*a*, 30*b* allows the working fluid to flow in one direction from a corresponding one of the intermediate passages 34, 35 to the merge point, and blocks the opposite flow of the working fluid. Therefore, the supply pressure selection circuit 30 selects and outputs the higher one of the first travel-end supply pressure and the second travel-end supply pressure at the two check valves 30*a*, 30*b*.

The travel-end pressure sensor 15A is connected to the supply pressure selection circuit 30. The supply pressure selection circuit 30 outputs the higher one of the first travel-end supply pressure and the second travel-end supply pressure to the travel-end pressure sensor 15A. Therefore, on the basis of the supply pressure that is output from the supply pressure selection circuit 30, the travel-end pressure sensor 15A detects a supply pressure that is the higher one of the first travel-end supply pressure and the second travel-end supply pressure.

Similar to the control device 17, the control device 17A controls the operations of the travel system hydraulic circuit 12A and the loading system hydraulic circuit 13. The control device 17A outputs the opening degree signal to the flow rate control valve 14 according to the travel-end supply pressure detected by the travel-end pressure sensor 15A and the loading-end supply pressures detected by the loading-end pressure sensors 18 to 20. Therefore, the control spool 14*a* moves to a position corresponding to the travel-end supply pressure detected by the travel-end pressure sensor 15A and the loading-end supply pressures detected by the loading-end pressure sensors 18 to 20.

The hydraulic drive apparatus 1A according to Embodiment 2 performs substantially the same operation as the hydraulic drive apparatus 1 according to Embodiment 1.

In the hydraulic drive apparatus 1A according to Embodiment 2, the supply pressure selection circuit 30 selects the higher one of the first travel-end supply pressure and the second travel-end supply pressure, and outputs the selected travel-end supply pressure to the travel-end pressure sensor 15A. Therefore, the number of travel-end pressure sensors 15A can be reduced.

The hydraulic drive apparatus 1A according to Embodiment 2 produces substantially the same advantageous effects as those produced in Embodiment 1.

Other Embodiments

The hydraulic drive apparatuses 1, 1A according to Embodiments 1, 2 include two travel motors 2, 3 to which the travel system hydraulic circuits 12, 12A supply the working fluid; however, there may be a single travel motor to which the travel system hydraulic circuit 12 supplies the working fluid, meaning that the number of travel motors is not limited. Similarly, the number of loading actuators to which the loading system hydraulic circuit 13 supplies the working fluid is not limited. Furthermore, the loading actuator to which the loading system hydraulic circuit 13 supplies the working fluid is not limited to the hydraulic cylinder and may be a hydraulic motor.

Furthermore, the structures of the travel system hydraulic circuits 12, 12A and the loading system hydraulic circuit 13 in the hydraulic drive apparatuses 1, 1A according to Embodiments 1, 2 are not limited to those described above. It is sufficient that the travel system hydraulic circuits 12, 12A and the loading system hydraulic circuit 13 be circuits capable of supplying the working fluid to the travel motors 2, 3 and the hydraulic cylinders 4 to 6. Moreover, in the hydraulic drive apparatuses 1, 1A, the control devices 17, 17A may operate the travel motors 2, 3 and the loading actuators 4 to 6 according to the program stored in advance. The control devices 17, 17A obtain the hydraulic pressures directly from the travel-end pressure sensors 15, 16, 15A and the loading-end pressure sensors 18 to 20, but may obtain the hydraulic pressures indirectly, for example, via a device not illustrated in the drawings.

Figure 3:
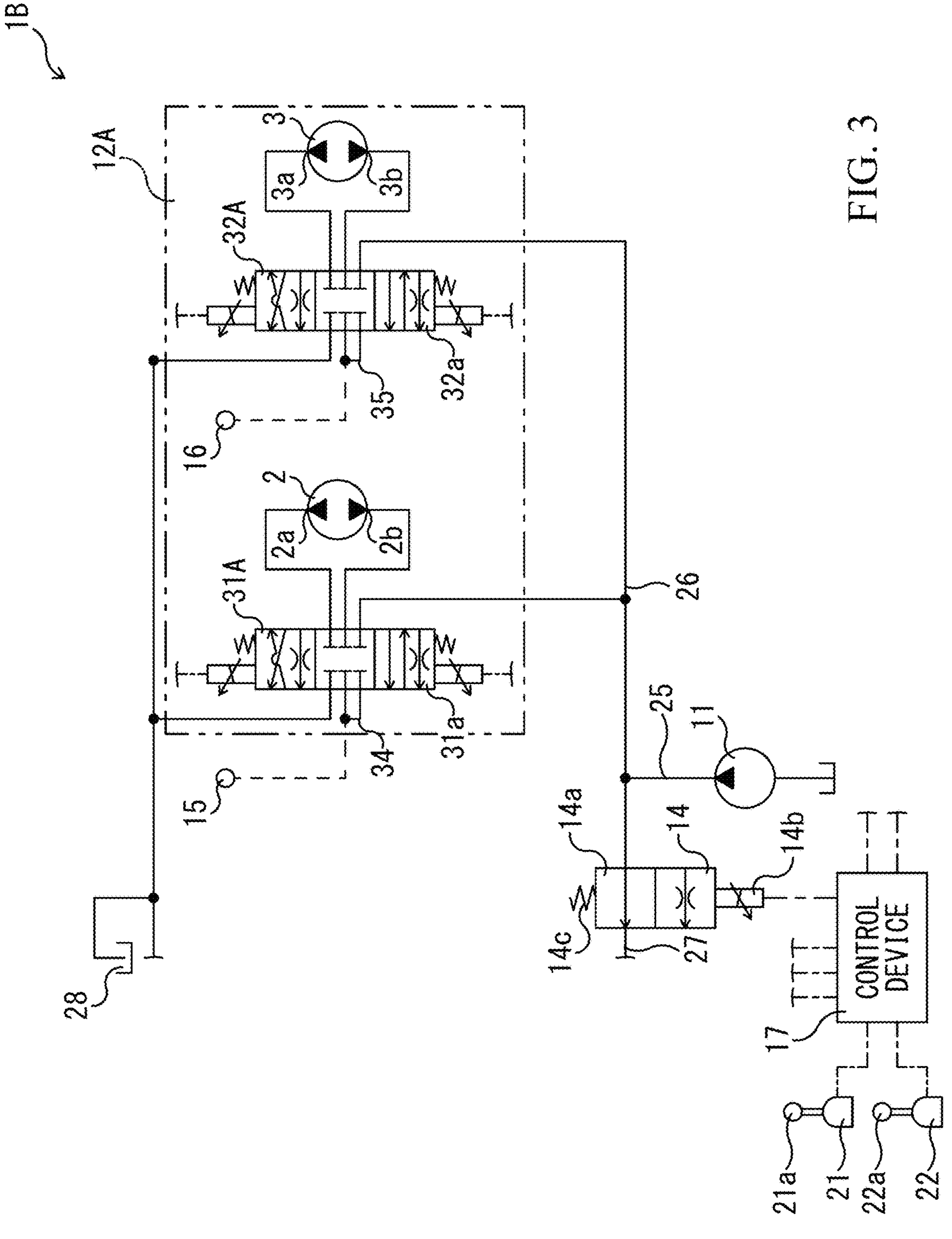
FIG. 3 is a circuit diagram illustrating a travel system hydraulic circuit of a hydraulic drive apparatus according to another embodiment of the present invention.

Hydraulic drive apparatuses 1B, 1C may be configured as follows. Specifically, as illustrated in FIG. 3, the travel-end pressure sensors 15, 16 may be connected to the intermediate passages 34, 35, respectively, in the hydraulic drive apparatus 1B.

Figure 4:
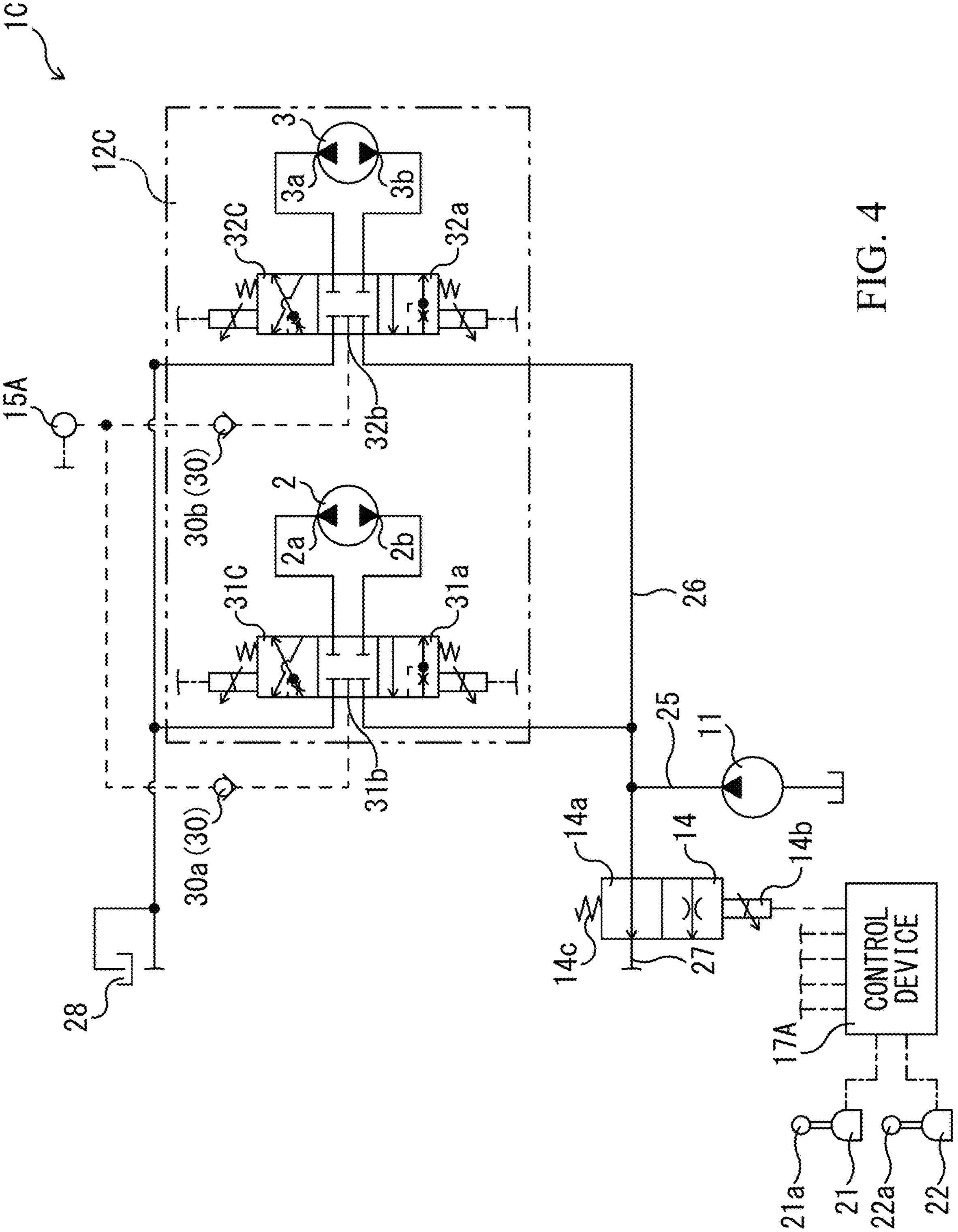
FIG. 4 is a circuit diagram illustrating a travel system hydraulic circuit of a hydraulic drive apparatus according to yet another embodiment of the present invention.

As illustrated in FIG. 4, in the hydraulic drive apparatus 1C, instead of the intermediate passages 34, 35, supply pressure detection ports 31*b*, 32*b* may be formed on a first traveling directional control valve 31C and a second directional control valve 32C, respectively, in a travel system hydraulic circuit 12C. In this case, the supply pressure selection circuit 30 is connected to each of the supply pressure detection ports 31*b*, 32*b*, and obtains the first travel-end supply pressure and the second travel-end supply pressure from the supply pressure detection ports 31*b*, 32*b*. Note that in the hydraulic drive apparatus 1C, the travel-end pressure sensors 15, 16 may be connected to the supply pressure detection ports 31*b*, 32*b*, respectively.

Figure 5:
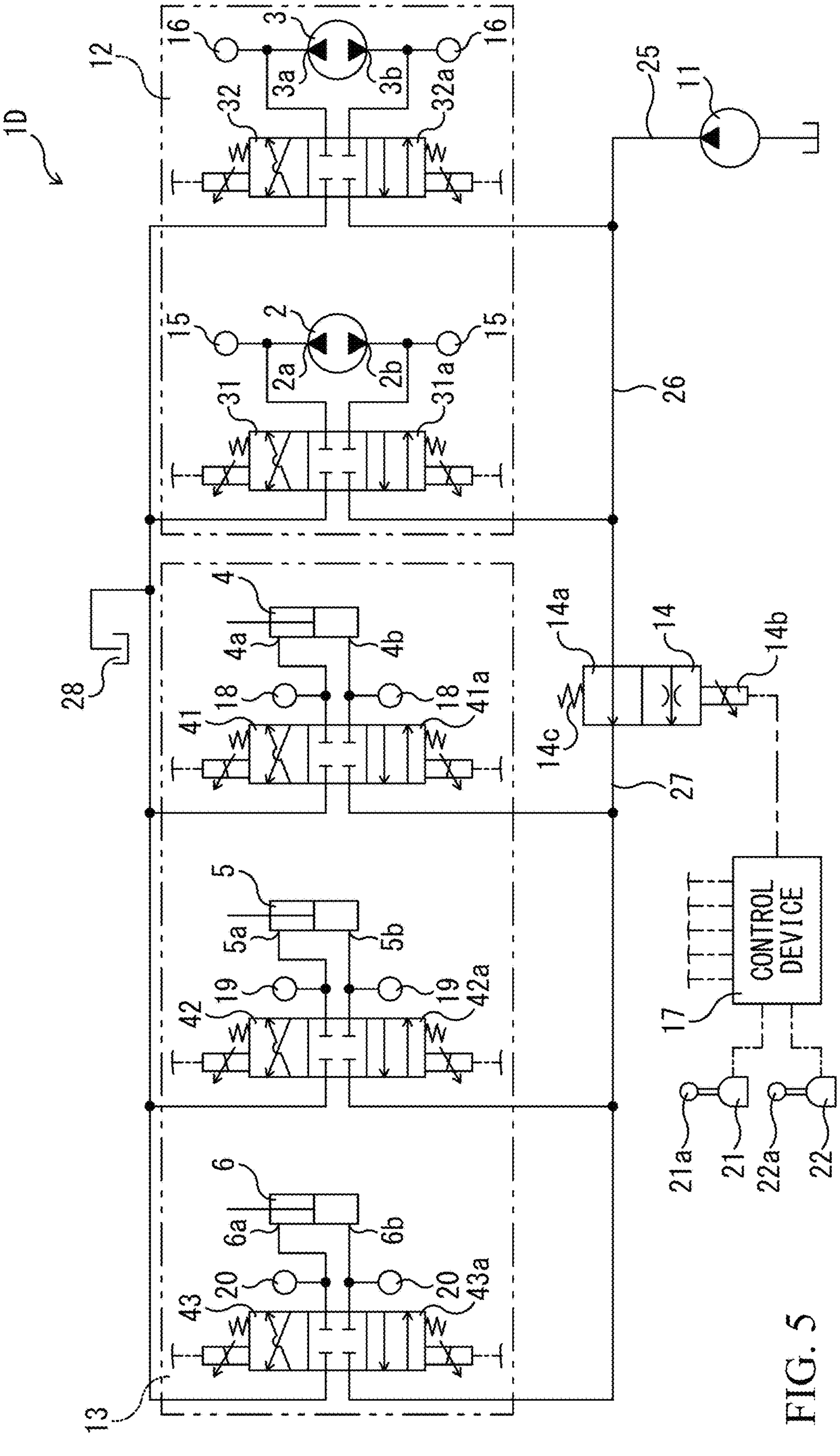
FIG. 5 is a circuit diagram illustrating the configuration of a hydraulic drive apparatus according to another embodiment of the present invention.

Furthermore, in the hydraulic drive apparatuses 1, 1A to 1C according to Embodiments 1 to 4, the pump passage 25 is divided as the first passage 26 and the second passage 27, but the pump passage 25 may be configured as that in a hydraulic drive apparatus 1D illustrated in FIG. 5. Specifically, the first passage 26 may be connected to the pump passage 25, and the second passage 27 may be connected to the pump passage 25 via the first passage 26. In other words, the first passage 26 and the second passage 27 may be connected in series to the pump passage 25. The hydraulic drive apparatus 1D according to this embodiment also produces advantageous effects that are substantially the same as those produced by the hydraulic drive apparatus 1 according to Embodiment 1.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

REFERENCE CHARACTER LIST

1, 1A-1D hydraulic drive apparatus
2 first travel motor
3 second travel motor
4 hydraulic cylinder (loading actuator)
5 hydraulic cylinder (loading actuator)
6 hydraulic cylinder (loading actuator)
11 hydraulic pump
12, 12A travel system hydraulic circuit
13 loading system hydraulic circuit
14 flow rate control valve
15, 15A first travel-end pressure sensor
16 second travel-end pressure sensor
17, 17A control device
18 loading-end pressure sensor
19 loading-end pressure sensor
20 loading-end pressure sensor
25 pump passage
26 first passage
27 second passage
30 supply pressure selection circuit
31, 31A, 31C first traveling directional control valve
32, 32A, 32C second traveling directional control valve
41 loading directional control valve
42 loading directional control valve
43 loading directional control valve

The invention claimed is:

1. A hydraulic drive apparatus that supplies a working fluid to a travel motor and a loading actuator, the hydraulic drive apparatus comprising:

a hydraulic pump that discharges the working fluid;

a travel system hydraulic circuit that is connected to a first passage branching from a pump passage connected to the hydraulic pump and controls a flow of the working fluid to the travel motor;

a loading system hydraulic circuit that is connected to a second passage branching from the pump passage and controls a flow of the working fluid to the loading actuator;

a flow rate control valve that is interposed in the second passage and changes an opening degree of the second passage according to an opening degree signal;

a travel-end pressure sensor that detects a travel-end supply pressure that is a pressure being supplied to the travel motor;

a loading-end pressure sensor that detects a loading-end supply pressure that is a pressure being supplied to the loading actuator; and a control device that controls, by outputting the opening degree signal to the flow rate control valve, the opening degree of the second passage according to the travel-end supply pressure detected by the travel-end pressure sensor and the loading-end supply pressure detected by the loading-end pressure sensor.

2. The hydraulic drive apparatus according to claim 1, further comprising:

a first travel-end pressure sensor and a second travel-end pressure sensor each being the travel-end pressure sensor, wherein the travel system hydraulic circuit supplies the working fluid to a first travel motor and a second travel motor each being the travel motor, the first travel-end pressure sensor detects a first travel-end supply pressure that is a pressure being supplied to the first travel motor, the second travel-end pressure sensor detects a second travel-end supply pressure that is a pressure being supplied to the second travel motor, and the control device controls the opening degree of the second passage according to the first travel-end supply pressure detected by the first travel-end pressure sensor and the second travel-end supply pressure detected by the second travel-end pressure sensor.

3. The hydraulic drive apparatus according to claim 2, wherein the travel system hydraulic circuit includes: a first traveling directional control valve that controls a flow of the working fluid to the first travel motor; and a second traveling directional control valve that controls a flow of the working fluid to the second travel motor, the first travel-end pressure sensor detects a hydraulic pressure of the working fluid being supplied from the first traveling directional control valve to the first travel motor, and the second travel-end pressure sensor detects a hydraulic pressure of the working fluid being supplied from the second traveling directional control valve to the second travel motor.

4. The hydraulic drive apparatus according to claim 1, further comprising:

a supply pressure selection circuit, wherein the travel system hydraulic circuit supplies the working fluid to a first travel motor and a second travel motor each being the travel motor, the supply pressure selection circuit outputs, to the travel-end pressure sensor, a higher one of a first travel-end supply pressure that is a pressure being supplied to the first travel motor and a second travel-end supply pressure that is a pressure being supplied to the second travel motor, and the control device controls the opening degree of the second passage according to the travel-end supply pressure detected by the travel-end pressure sensor.

5. The hydraulic drive apparatus according to claim 4, wherein the control device actuates the flow rate control valve on the basis of a maximum value of a plurality of loading-end supply pressures and a maximum value of the first travel-end supply pressure and the second travel-end supply pressure.

6. A hydraulic drive apparatus that supplies a working fluid to a travel motor and a loading actuator, the hydraulic drive apparatus comprising:

a hydraulic pump that discharges the working fluid;

a travel system hydraulic circuit that is connected to a first passage branching from a pump passage connected to the hydraulic pump and controls a flow of the working fluid to the travel motor;

a loading system hydraulic circuit that is connected to a second passage branching from the pump passage and controls a flow of the working fluid to the loading actuator;

a flow rate control valve that is interposed in the second passage and changes an opening degree of the second passage according to an opening degree signal;

a travel-end pressure sensor that detects a travel-end supply pressure that is a pressure being supplied to the travel motor;

a control device that controls, by outputting the opening degree signal to the flow rate control valve, the opening degree of the second passage according to the travel-end supply pressure detected by the travel-end pressure sensor; and a plurality of loading-end pressure sensors, wherein the loading system hydraulic circuit supplies the working fluid to each of a plurality of loading actuators including the loading actuator, each of the plurality of loading-end pressure sensors detects a pressure being supplied to a corresponding one of the plurality of loading actuators, and the control device controls the opening degree of the second passage according to the travel-end supply pressure detected by the travel-end pressure sensor and a plurality of loading-end supply pressures detected by the plurality of loading-end pressure sensors.

7. The hydraulic drive apparatus according to claim 6, wherein the loading system hydraulic circuit includes a plurality of loading directional control valves, each of the plurality of loading directional control valves controls a flow of the working fluid being supplied to a corresponding one of the plurality of loading actuators, and each of the plurality of loading-end pressure sensors detects a supply pressure of the working fluid being supplied from a corresponding one of the plurality of loading directional control valves to a corresponding one of the plurality of loading actuators.

8. A hydraulic drive apparatus that supplies a working fluid to a travel motor and a loading actuator, the hydraulic drive apparatus comprising:

a hydraulic pump that discharges the working fluid;

a travel system hydraulic circuit that is connected to a first passage leading to a pump passage connected to the hydraulic pump and controls a flow of the working fluid to the travel motor;

a loading system hydraulic circuit that is connected to a second passage leading to the pump passage via the first passage and controls a flow of the working fluid to the loading actuator;

a flow rate control valve that is interposed in the second passage and changes an opening degree of the second passage according to an opening degree signal;

a travel-end pressure sensor that detects a travel-end supply pressure that is a pressure being supplied to the travel motor;

a loading-end pressure sensor that detects a loading-end supply pressure that is a pressure being supplied to the loading actuator; and a control device that controls, by outputting the opening degree signal to the flow rate control valve, the opening degree of the second passage according to the travel-end supply pressure detected by the travel-end pressure sensor and the loading-end supply pressure detected by the loading-end pressure sensor.

* * * * *